US008363586B2

(12) United States Patent
Rosario et al.

(10) Patent No.: US 8,363,586 B2
(45) Date of Patent: Jan. 29, 2013

(54) SOCIAL NETWORKING AND ADVERTISEMENTS IN A MOBILE DEVICE ON A LOCAL PERSONAL AREA NETWORK

(75) Inventors: Barbara Rosario, Berkeley, CA (US); Shivani Sud, Santa Clara, CA (US); Trevor Pering, San Francisco, CA (US); Roy Want, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 1066 days.

(21) Appl. No.: 12/347,770

(22) Filed: Dec. 31, 2008

(65) Prior Publication Data
US 2010/0165961 A1    Jul. 1, 2010

(51) Int. Cl.
*H04W 4/00* (2009.01)
(52) U.S. Cl. .... 370/312; 370/338; 455/41.2; 455/414.1; 455/434; 709/223; 709/230
(58) Field of Classification Search .......... None
See application file for complete search history.

(56) References Cited

U.S. PATENT DOCUMENTS

| 7,483,952 | B2 * | 1/2009 | Light et al. ............ 709/207 |
| 7,987,491 | B2 * | 7/2011 | Reisman ............ 725/112 |
| 8,117,284 | B2 * | 2/2012 | Light et al. ............ 709/219 |
| 2002/0160793 | A1 | 10/2002 | Pradhan et al. |
| 2005/0282571 | A1 * | 12/2005 | Oprescu-Surcobe et al. 455/503 |
| 2006/0094456 | A1 | 5/2006 | Rittle et al. |
| 2007/0141984 | A1 | 6/2007 | Kuehnel et al. |
| 2007/0141988 | A1 | 6/2007 | Kuehnel et al. |
| 2007/0299737 | A1 | 12/2007 | Plastina et al. |
| 2009/0161581 | A1 | 6/2009 | Kim |
| 2009/0245133 | A1 | 10/2009 | Gupta et al. |
| 2010/0020746 | A1 * | 1/2010 | Zaks ............ 370/328 |

FOREIGN PATENT DOCUMENTS

| KR | 2007-0099267 A | 10/2007 |
| WO | 2007103055 A2 | 9/2007 |
| WO | 2007136622 A2 | 11/2007 |
| WO | 2009120576 A2 | 10/2009 |

OTHER PUBLICATIONS

Office Action received for United Kingdom Patent Application No. G60922450.2, mailed on Mar. 30, 2010, 5 pgs.
Office Action received for German Patent Application No. 10 2009 060 268.2, mailed on Mar. 15, 2011, 18 pgs., including 7 pgs. English translation.
Office Action received for Korean Patent Application No. 2009-0131229, mailed on Apr. 22, 2011, 3 pgs.English translation.
Office Action received for Japanese Patent Application No. 2009-293553, mailed on Sep. 20, 2011, 4 pgs., including 2 pgs. English translation.
Office Action received for Chinese Patent Application No. 200910262564.1, mailed on Apr. 28, 2012, 23 pgs., including 15 pgs. English translation.

* cited by examiner

*Primary Examiner* — Chi H. Pham
*Assistant Examiner* — Shick Hom
(74) *Attorney, Agent, or Firm* — Kacvinsky Daisak PLLC

(57) ABSTRACT

Methods and apparatus are disclosed for media access control (MAC) layer processing to support social networking and advertisements over the MAC layer of a local personal area network (PAN). An application interface permits a service category corresponding to the application to be selected, and further permits service announcements corresponding to the application to be advertised. Generator logic may generate the service announcements to be advertised. The MAC layer processor inserts the service announcements into beacons in the local MAC layer of the local PAN and also receives advertisements from other devices over the MAC layer of the local PAN. Monitor logic can monitor the MAC layer of the local PAN for advertisements corresponding to the selected service category. The monitor logic is also operatively coupled with the application interface for displaying advertised services corresponding to the selected service category.

32 Claims, 6 Drawing Sheets

SOCIAL NETWORKING AND ADVERTISEMENTS IN A MOBILE DEVICE ON A LOCAL PERSONAL AREA NETWORK

CROSS-REFERENCE TO RELATED APPLICATIONS

This disclosure is related to U.S. patent application Ser. No. 12/060,009, titled "Additive Service Beacon," filed Mar. 31, 2008.

FIELD OF THE DISCLOSURE

This disclosure relates generally to the field of wireless networking. In particular, the disclosure relates to advertising local services from providing devices to local service monitoring/requesting devices, and for monitoring and/or displaying advertised services from local providing devices of select service categories and/or preferences prior to (or without) establishing MAC layer or network layer connections with any particular monitoring/requesting devices

BACKGROUND OF THE DISCLOSURE

A personal area network (PAN) is a network that encompasses an area of proximity (e.g. from one meter to one hundred meters) around a person with a wireless network device. Wireless PANs such as those based on Ultra Wideband (UWB) technology can provide capabilities to devices (e.g. media players, digital cameras and camcorders) for connecting together automatically whenever they come within range of each other.

Microsoft manufactures a proprietary digital media player called Zune for playing music, videos, podcasts, and channel selections. As an example of an application in a PAN, these devices can share files wirelessly with other Zunes via a Wi-Fi connection just as they might share files with computers via a universal serial bus (USB) connection.

A Japanese company named Erfolg manufactures a proprietary device for social networking called Lovegety with three buttons that the user sets according to a kind of activity she or he has in mind: "talk," "karaoke," and "get2." The last button is a wild card, which could mean "get together." The device searches for Lovegety holders of the opposite sex within a five meter radius. If it locates a Lovegety holder with the same mode, a light flashes and the device beeps, so the pair can find each other.

While such devices may provide for certain types of file sharing, social networking and/or communications in PANs, when more numerous devices are present (e.g. in large crowds or areas of heavy traffic) devices may spend considerable time, resources and energy establishing unnecessary connections. On the other hand, when a proprietary connection or network is being used, there may be no compatible devices available within range, or users of the only compatible devices within range may not share the same taste in music, or enthusiasm for talking, or enjoyment of karaoke, etc. Thus the usefulness of such devices' wireless networking capabilities may not be fully realized.

To date, more effective techniques for social networking and advertising local services from providing devices to local monitoring/requesting devices, and for monitoring and/or displaying advertised services have not been fully explored.

BRIEF DESCRIPTION OF THE DRAWINGS

The present invention is illustrated by way of example and not limitation in the figures of the accompanying drawings.

DETAILED DESCRIPTION

Figure 1:
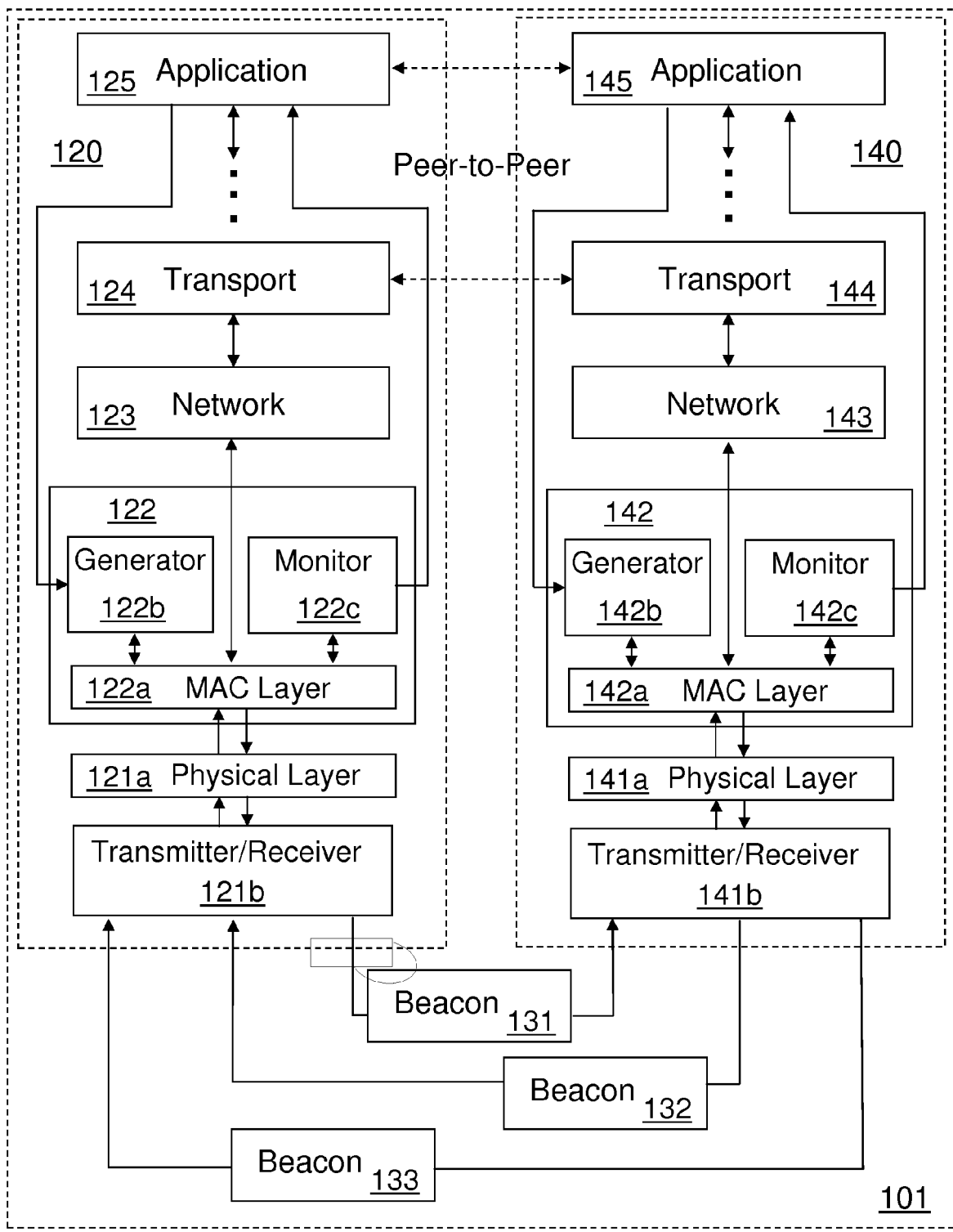
FIG. 1 illustrates one embodiment of a wireless system capable of supporting social networking and service advertisements over a media access control (MAC) layer of a local personal area network (PAN).

Methods and apparatus are disclosed below for media access control (MAC) layer processing to support social networking and service advertisements over the MAC layer of a local personal area network (PAN). An application interface permits a service category corresponding to the application to be selected, and further permits service announcements corresponding to the application to be advertised. Generator logic may generate the service announcements to be advertised. The MAC layer processor inserts the service announcements into the beacons in the MAC layer of the local PAN and also receives advertisements from other devices over the beacons in the MAC layer of the local PAN. Monitor logic can monitor the beacons in the MAC layer of the local PAN for advertisements corresponding to the selected service category. The monitor logic is also operatively coupled with the application interface for displaying advertised services corresponding to the selected service category.

Thus, the disclosed methods and apparatus represent effective techniques for social networking and advertising local services from the providing devices to the local monitoring devices over the MAC layer of a local PAN, and for monitoring and/or displaying the advertised services from local providing devices of select service categories or preferences on local monitoring devices prior to (or without) actually establishing a network layer connection.

In the following description, numerous specific details are set forth. However, it is understood that embodiments of the invention may be practiced without these specific details. In other instances, well-known circuits, structures and techniques have not been shown in detail in order not to obscure the understanding of this description. These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than a restrictive sense and the invention measured only in terms of the claims and their equivalents.

The following embodiments may be used in a variety of applications including transmitters and receivers of a mobile wireless radio system. Radio systems specifically included within the scope of the embodiments of the present invention may include, but are not limited to, network interface cards (NICs), network adaptors, base stations, access points (APs), gateways, bridges, hubs and satellite radiotelephones. Further, the radio systems within the scope of embodiments of the invention may include satellite systems, personal communication systems (PCS), two-way radio systems, global positioning systems (GPS), two-way pagers, laptops, personal computers (PCs) and related peripherals, personal digital assistants (PDAs), MP3 players, set-top boxes, DVD players, digital cameras, mobile phones, personal computing accessories and all existing and future arising systems which may be related in nature and to which the principles of the embodiments could be suitably applied.

In a conventional wireless network including a plurality of wireless devices offering different types of services, a service consuming device may discover a service providing device by listening to the service providing device's Media Access Control (MAC) layer announcements. Each announcement may include very basic information about the service providing device. For example, a Bluetooth compatible service providing device may only specify a class of the service providing device in its MAC layer announcement, but this information may be limited (e.g., 24 bits), and may not describe the services available. That is, this type of MAC layer announcements may help in device discovery, but not for discovering the types of services (or other associated information) provided by the discovered service providing device.

To obtain information about one or more types and/or description of services offered by the service providing device, the service consuming device may have to first establish a wireless connection with the service providing device. For example, the service consuming device may have to first discover the service providing device, obtain an internet protocol (IP) address of the service providing device, establish an IP connection with the service providing device, and then, using an appropriate technique (e.g., listen for IP layer service broadcast, probe the service providing device for service description, listen for universal plug and play (UPnP) broadcast, etc.) discover more detailed information about one or more types of services offered by the service providing device.

To merely obtain information about one or more types and/or description of services offered by the service providing device requires establishing a wireless connection with the service providing device and then negotiating assignment of an IP address to be able to establish a network layer connection between the two devices, thereby consuming valuable time and resources of both of the devices.

The problem may be worse if the service consuming device desires to consume a specific type of service, and there is a large number of devices in the wireless network, of which only one device may be offering the specific type of service. The service consuming device, in this case, may have to establish connections with each potential service providing device, one after another, until the service consuming device discovers the service providing device offering the specific desired type of service.

On the other hand, embodiments of wireless network systems capable of supporting social networking and service advertisements over the MAC layer of a local wireless network (e.g. an ad-hoc network) can save valuable time and resources by providing for exchange of personal information and/or preference information prior to (or without) establishing a network layer connection. An application interface can permit service categories and/or preferences corresponding to the application to be selected, and can also permit service announcements corresponding to the application to be advertised. Generator logic may generate one or more service announcements capable of carrying the personal information and/or preference information for the service announcements to be advertised. The MAC layer processor inserts the service announcements onto the MAC layer of the local wireless network and receives advertisements from other devices over the MAC layer of the local wireless network. Monitor logic can monitor the MAC layer of the local wireless network for advertisements corresponding to the selected service category and/or preferences. The monitor logic is also operatively coupled with the application interface to cause advertised services corresponding to the selected service categories to be displayed or to cause network layer connections to be established.

FIG. 1 illustrates one embodiment of a wireless network system 101 capable of supporting social networking and service advertisements over a MAC layer of a local PAN. Network device 120 and network device 140 may establish peer-to-peer communications, for example, between application 125 layer and application 145 layer or between transport layer 124 and transport layer 144. Such communications may be routed from network layer 123 to network layer 143 across the local PAN (e.g. a local ad-hoc network).

Prior to establishing a wireless connection from network layer 123 to network layer 143 between the two devices, which would consume valuable time and resource of both the devices, advantageous use may be made of the support for social networking and service advertisements over the MAC layer of the local PAN. Application 125 layer and application 145 layer of network device 120 and network device 140 respectively include application interfaces to permit service categories corresponding to application 125 and application 145 to be selected, and to permit service announcements corresponding to the applications to be advertised. Network device 120 and network device 140 respectively include generator logic 122b and generator logic 142b to generate the service announcements that are to be advertised, and MAC layer processors 122a and 142a to insert the service announcements into the beacons in the MAC layer of the PAN. Physical layer processor 121a and physical layer processor 141a process the beacons with the service announcements so as to be wirelessly transmitted via radio transmitter/receiver 121b and radio transmitter/receiver 141b respectively as beacon 131 and beacons 132-133 in the MAC layer of the PAN.

It will be appreciated that in some embodiments the service announcements may be transmitted as one or more beacon 131 and/or beacons 132-133 in one or more MAC layer superframes of an ultra-wideband (UWB) wireless network. In alternative embodiments service announcements may be transmitted as one or more beacon frames 131 and/or 132-133 in the MAC layer of an 802.11 wireless network (e.g. 802.11n) but the invention is not so limited.

MAC layer processors 122a and 142a also receive advertisements from device 140 and device 120 respectively and from other devices on the MAC layer of the PAN. Network device 120 and network device 140 also respectively include monitor logic 122c and monitor logic 142c coupled with their respective application interfaces to monitor the MAC layer of the PAN for advertisements corresponding to their selected service categories, which may be displayed by application 125 and/or by application 145. It will be appreciated that such service categories in some embodiments may be determined by or identified with application-specific keys transmitted in the service information transmitted as a part of one or more MAC layer beacons, or may be inferred, from other personal information or preference information transmitted in the one or more MAC layer beacons, by an inferencing mechanism associated with monitor logic 122c and/or monitor logic 142c (e.g. in middleware). Such inferencing mechanisms may or may not be associated with any particular application and may also determine how well the transmitted advertisements, personal information or preference information matches with applications, service categories, personal information or preference information associated with the receiving device or with the user of the receiving device. In some embodiments, inferencing mechanisms associated with monitor logic 122c and/or monitor logic 142c may then select which application 125 and/or application 145 to use in order to display advertisements, request connections or services, or otherwise communicate the transmitted information.

Figure 2:
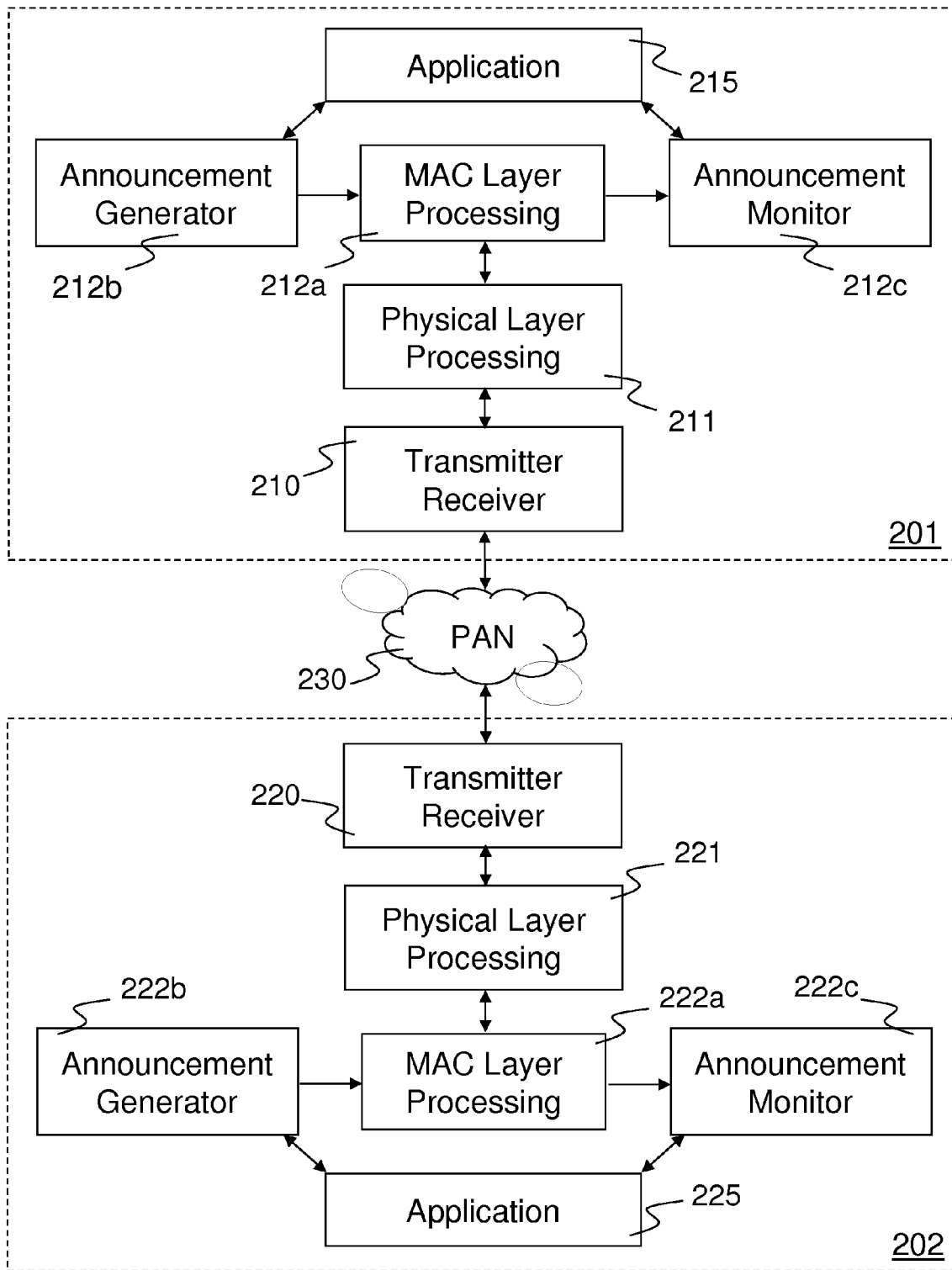
FIG. 2 illustrates an alternative embodiment of a wireless system capable of supporting social networking and service advertisements over the MAC layer of a local PAN.

FIG. 2 illustrates an alternative embodiment of a wireless system including a device 201 and a device 202 capable of supporting social networking and service advertisements over the MAC layer of a local PAN 230 (e.g. an ad-hoc wireless network). PAN device 201 and device 202 respectively include application 215 and application 225, each of application 215 and application 225 having and an application interface to permit service categories corresponding to application 215 and to application 225 to be selected, and to permit service announcements corresponding to the applications to be advertised. PAN device 201 and device 202 respectively include announcement generator logic 212b and announcement generator logic 222b to generate the service announcements that are to be advertised over the beacons, and MAC layer processors 212a and 222a to insert the service announcements into the beacons in the MAC layer of the PAN. Physical layer processor 211 and Physical layer processor 221 process the beacons that contain these service announcements so as to be wirelessly transmitted via radio transmitter/receiver 210 and radio transmitter/receiver 220 respectively as beacon frames in the MAC layer of the PAN.

MAC layer processors 212a and 222a also receive advertisements from device 202 and device 201 respectively and from other devices on the MAC layer of the PAN. PAN device 201 and device 202 also respectively include announcement monitor logic 212c and announcement monitor logic 222c coupled with their respective application interfaces to monitor the MAC layer of the PAN for advertisements corresponding to their selected service categories, which may be displayed by application 215 and/or application 225.

Thus, the above network devices may be effective for social networking and advertising local services over the MAC layer of a local PAN, and for monitoring and/or displaying the advertised services of select service categories or preferences prior to (or without) actually establishing a network layer connection.

Figure 3:
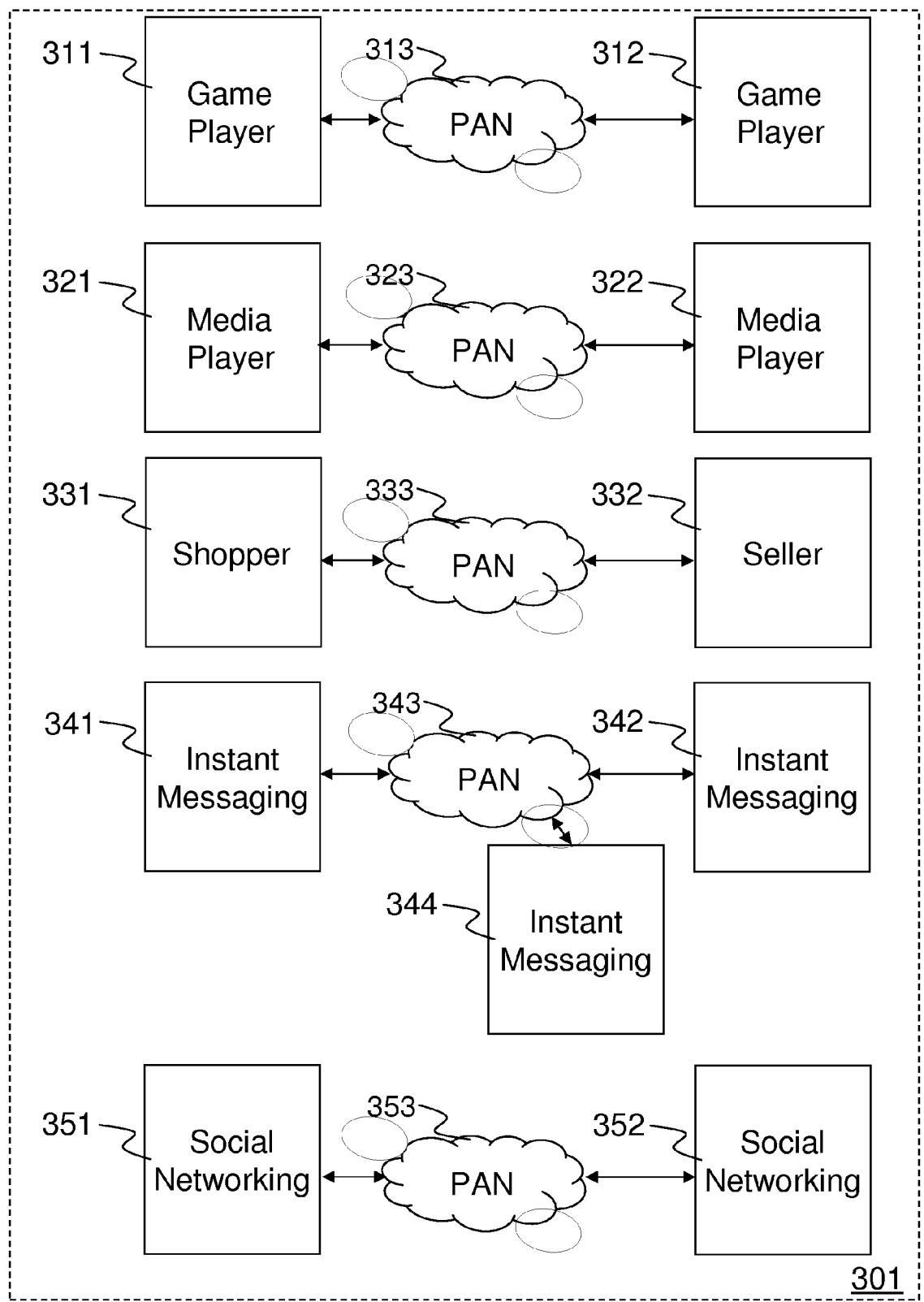
FIG. 3 illustrates embodiments of some applications that can make use of social networking and service advertisement capabilities over the MAC layer of a local PAN.

FIG. 3 illustrates example embodiments 301 of some applications that can make use of social networking and service advertisement capabilities over the MAC layer of a local PAN. The example embodiments 301 include a game player device 311 and a game player device 312 capable of supporting service announcements and advertisements corresponding to electronic game player applications in the beacons in the MAC layer of a local PAN 313. Some embodiments of electronic game player applications may include educational games, gambling games, arcade games, virtual reality games, tournaments, competitions or sports.

In an alternative example embodiment, media player device 321 and media player device 322 are capable of supporting service announcements and advertisements corresponding to digital media player applications in the beacons in the MAC layer of a local PAN 323. Some embodiments of digital media player applications may include MP3 players, digital radio or television players, movie players, picture viewers, or podcast players.

In another alternative example embodiment, a shopper device 331 and a seller device 332 are capable of supporting service announcements and advertisements corresponding to shopping applications in the beacons in the MAC layer of a local PAN 333. Some embodiments of shopping applications may include search engines, on-line auctions, on-line ticket exchanges, sight-seeing guides, or restaurant guides.

In another alternative example embodiment, instant messaging device 341, instant messaging device 342 and instant messaging device 344 are capable of supporting service announcements and advertisements corresponding to instant messaging applications in the beacons in the MAC layer of a local PAN 343. Some embodiments of instant messaging applications may include chat rooms, blogs, technical assistants, instant messengers, social messaging utilities, or office communicators.

In another alternative example embodiment, a social networking device 351 and a social networking device 352 are capable of supporting social networking service announcements and advertisements corresponding to social networking applications in the beacons in the MAC layer of a local PAN 353. Some embodiments of social networking applications may include virtual realities, match-makers, dating services, chat lines, clubs, or online social utilities.

Thus numerous applications on diverse device platforms may make advantageous use of wireless network systems capable of supporting social networking and advertisements over the MAC layer of a local wireless network (e.g. an ad-hoc network) and save valuable time and resources by providing for exchange of personal information and/or preference information over the beacons in the MAC layer prior to (or without) establishing a network layer connection.

Figure 4:
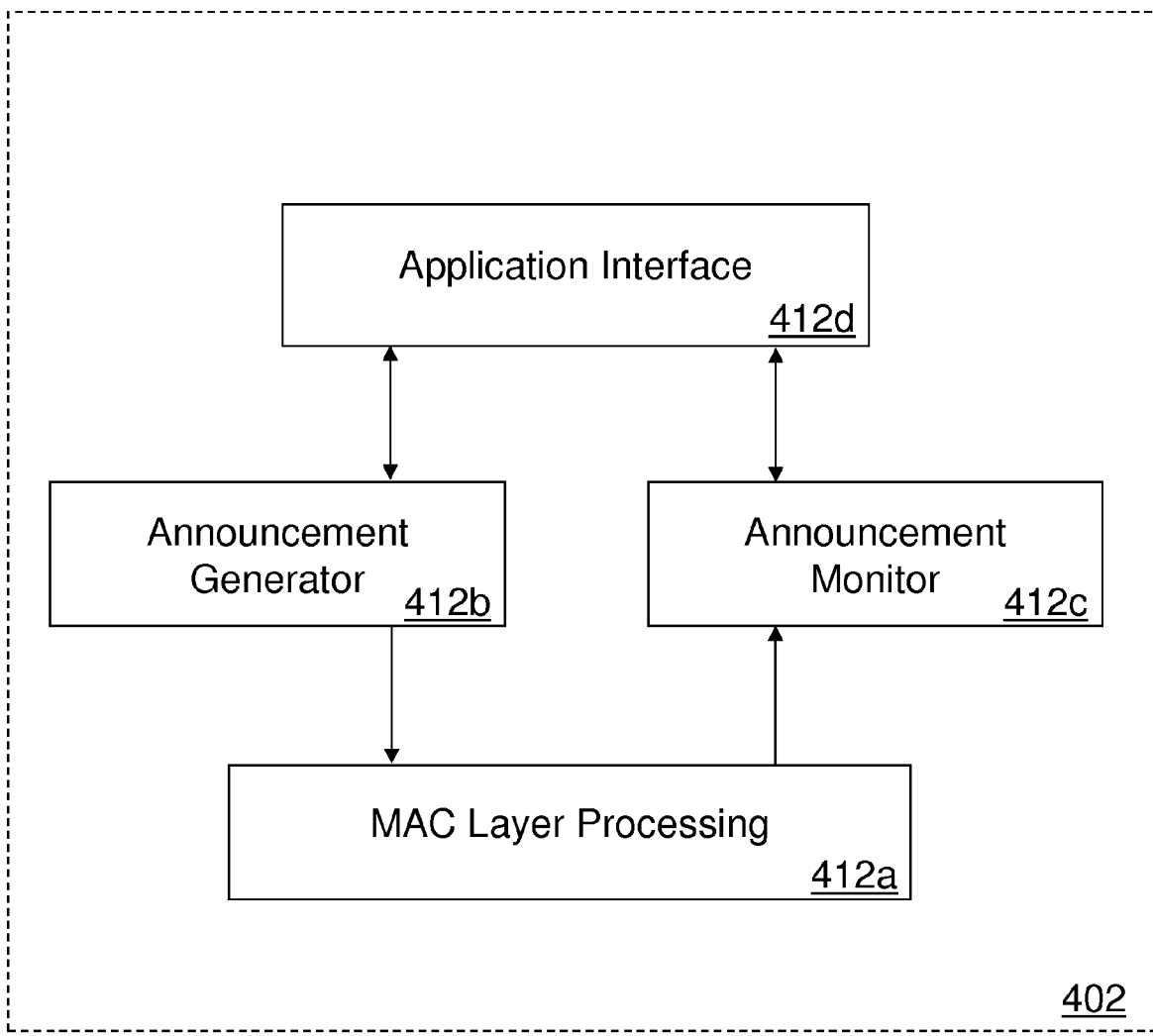
FIG. 4 illustrates one embodiment of an apparatus for MAC layer processing and for supporting social networking and service advertisements over the MAC layer of a local PAN.

FIG. 4 illustrates one embodiment of an apparatus 402 for MAC layer processing and for supporting social networking and advertisements over the MAC layer of a local PAN (e.g. in a NIC). Embodiments of apparatus 402 may include an application interface 412d (e.g. hooks or middleware) to permit service categories and/or preferences corresponding to various applications to be selected, and to permit service announcements corresponding to the applications to be advertised. Announcement generator logic 412b generates the service announcements to be advertised. MAC layer processing 421a inserts the service announcements into the beacons in the MAC layer of a local wireless network and also receives advertisements from other devices on the MAC layer of the wireless network. Announcement monitor logic 412c monitors the MAC layer of the wireless network for advertisements corresponding to any selected service categories and/or preferences corresponding to various applications.

Thus, apparatus 402 may be used effectively for social networking and advertising local services over the MAC layer of a local PAN, and for monitoring and/or displaying the advertised services of select service categories or preferences prior to (or without) actually establishing a network layer connection.

Figure 5:
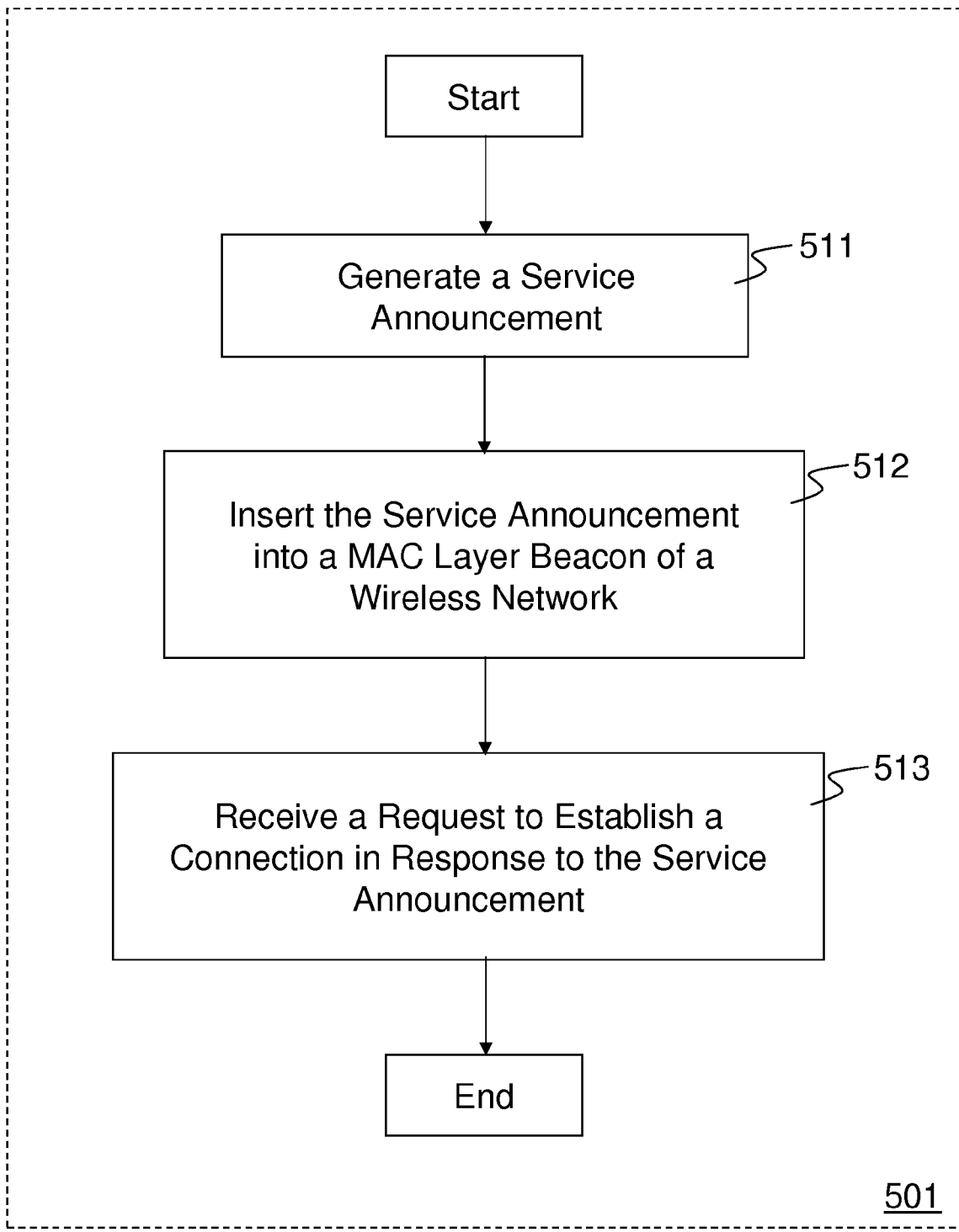
FIG. 5 illustrates a flow diagram for one embodiment of a process to support social networking and service advertisements over the MAC layer of a local PAN.

FIG. 5 illustrates a flow diagram for one embodiment of a process 501 to support social networking and service advertisements over the MAC layer of a local PAN. Process 501 and other processes herein disclosed are performed by processing blocks that may comprise dedicated hardware or software or firmware operation codes executable by general purpose machines or by special purpose machines or by a combination of both.

In processing block 511 a service announcement corresponding to an application is generated. In processing block 512 the service announcement is inserted into one or more MAC layer beacon(s) of a wireless network. In response to the service announcement, a request for a connection may be received in processing block 513 from another device on the ad-hoc wireless network. This request may be either on the same network interface over which the service advertisement was received or it may be on another network interface supported by the device. For example, a text message or phone call may be initiated in response to an advertisement on an ad-hoc wireless network. In some embodiments a uniform resource locator (URL) or other identifier may be included in the service announcement to facilitate such a request for connection.

It will be appreciated that process 501 provides for social networking and advertising local services from providing devices to local service monitoring/requesting devices over the MAC layer of a local wireless network prior to (or without) establishing a network layer connection.

Figure 6:
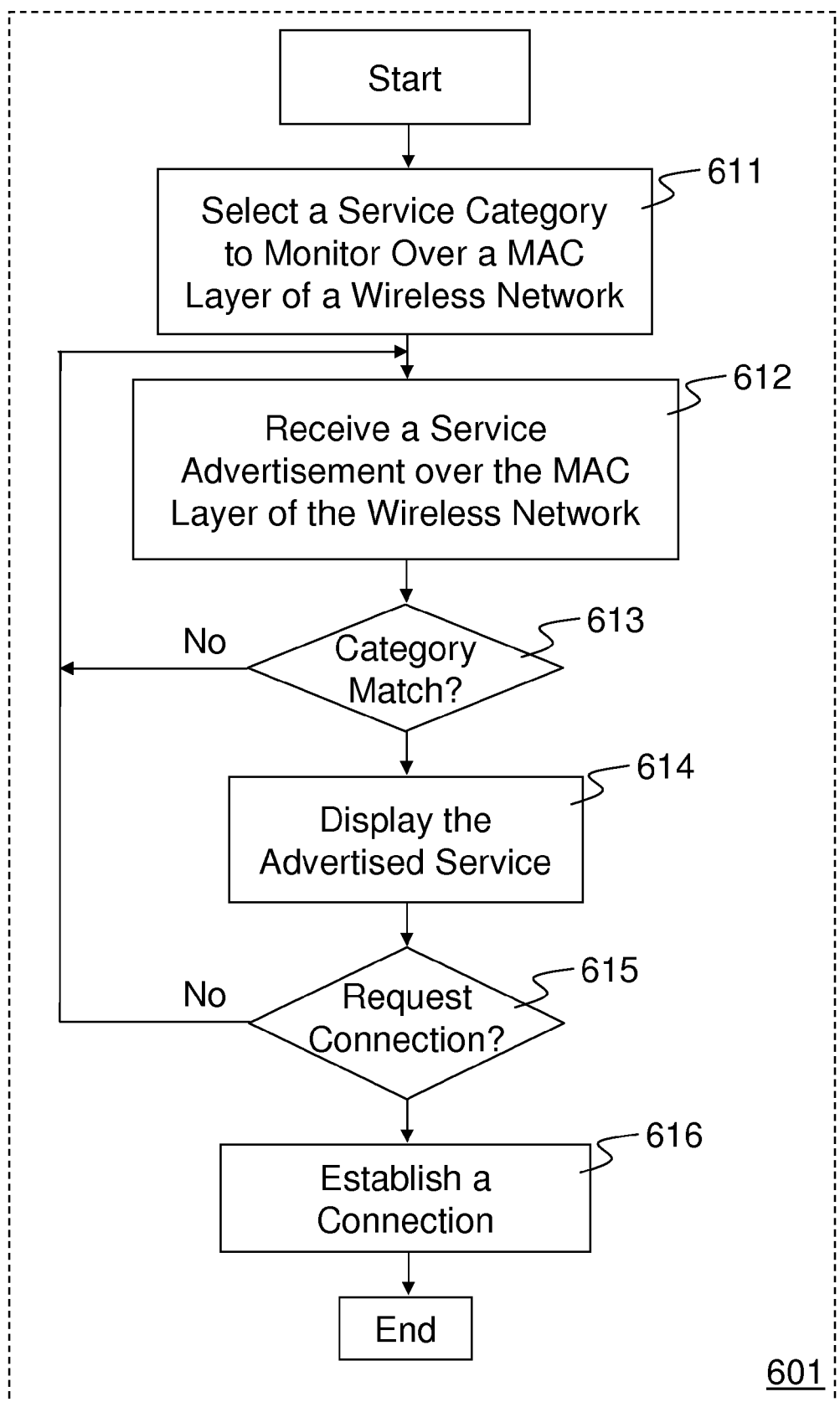
FIG. 6 illustrates a flow diagram for an alternative embodiment of a process to support social networking and service advertisements over the MAC layer of a local PAN.

FIG. 6 illustrates a flow diagram for an alternative embodiment of a process 601 to support social networking and advertisements over the MAC layer of a local PAN. In processing block 611 a service category and/or preferences corresponding to an application is selected to be monitored over the MAC layer of a local wireless network. In processing block 612, a service advertisement is received from another device on the local MAC layer of the wireless network. In processing block 613 the service advertisement received from another device is checked to determine if it corresponds to the selected service category and/or preferences. If not, processing repeats in processing block 612. Otherwise processing proceeds to processing block 614 where the advertised service may be displayed to provide the user with an opportunity to request a connection. In processing block 615 it is determined if a connection is requested. The connection request may be for the network interface over which the service advertisement was transmitted/received or it may be for another network interface supported by the device. If a connection is requested, in processing block 616 a network layer connection is established. Otherwise processing continues monitoring more service advertisements beginning in processing block 612.

It will be appreciated that process 601 provides for monitoring and/or displaying advertised services from local providing devices of select service categories and/or preferences prior to (or without) establishing a network layer connection.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A method comprising:
    generating a first service announcement corresponding to an application comprising a local service;
    advertising the first service announcement on a local media access control (MAC) layer of an ad-hoc wireless network;
    receiving a request for a connection from another device on the ad hoc wireless network responsive to the first service announcement; and
    establishing a network layer connection with the other device to allow the other device to access the application or to access an inferred application if the other device cannot access the application.

2. The method of claim 1 wherein the request for the connection from another device is a request for a network layer connection on the ad hoc wireless network.

3. The method of claim 1 wherein the request for the connection from another device is a request for a network layer connection on a network other than the ad hoc wireless network.

4. The method of claim 1 wherein the first service announcement is transmitted as a portion of one or more beacons in one or more MAC layer superframes of an ultra-wideband (UWB) wireless network.

5. The method of claim 1 wherein the first service announcement is transmitted as a portion of one or more beacon frames in the MAC layer of an 802.11 wireless network.

6. The method of claim 1 further comprising:
    selecting a service category corresponding to the application to monitor over the local MAC layer of the ad-hoc wireless network;
    receiving a second service advertisement from another device on the local MAC layer of the ad-hoc wireless network; and
    displaying the advertised second service if it corresponds to the selected service category.

7. The method of claim 1 wherein the advertised first service announcement corresponds to an electronic game player application.

8. The method of claim 1 wherein the advertised first service announcement corresponds to a digital media player application.

9. The method of claim 1 wherein the advertised first service announcement corresponds to a shopping application.

10. The method of claim 1 wherein the advertised first service announcement corresponds to an instant messaging application.

11. The method of claim 1 wherein the advertised first service announcement corresponds to a social networking application.

12. A method comprising:
    selecting a service category corresponding to an application to monitor over a local media access control (MAC) layer of an ad-hoc wireless network, the application comprising a local service;
    receiving a first service advertisement from another device on the local MAC layer of the ad-hoc wireless network;
    displaying the advertised first service if it corresponds to the selected service category; and
    requesting a network layer connection to access the application or to access an inferred application if the application cannot be accessed.

13. The method of claim 12 further comprising:
    generating a second service announcement corresponding to the application; and
    advertising the second service announcement on the local MAC layer of the ad-hoc wireless network.

14. The method of claim 13 wherein the second service announcement is transmitted as a portion of one or more beacons in one or more MAC layer superframes of an ultra-wideband (UWB) wireless network.

15. The method of claim 13 wherein the second service announcement is transmitted as a portion of one or more beacon frames in the MAC layer of an 802.11 wireless network.

16. The method of claim 12 wherein the service category corresponds to an electronic game player application.

17. The method of claim 12 wherein the service category corresponds to a digital media player application.

18. The method of claim 12 wherein the service category corresponds to a shopping application.

19. The method of claim 12 wherein the service category corresponds to an instant messaging application.

20. The method of claim 12 wherein the service category corresponds to a social networking application.

21. An apparatus for media access control (MAC) layer processing, the apparatus comprising:
   an application interface to permit a service category corresponding to an application to be selected, and to permit a service announcement corresponding to the application to be advertised, the application comprising a local service;
   a generator logic to generate the service announcement to be advertised;
   a MAC layer processor to insert the service announcement into a beacon in a local MAC layer of an ad-hoc wireless network and to receive advertisements from other devices on the local MAC layer of the ad-hoc wireless network; and
   a monitor logic to monitor the local MAC layer of the ad-hoc wireless network for advertisements corresponding to the selected service category, the monitor logic to select an application matching the service category or to select an inferred application if no application matching the service category is available.

22. The apparatus of claim 21 wherein the monitor logic is coupled with the application interface for displaying an advertised service corresponding to the selected service category.

23. The apparatus of claim 21 wherein the beacon for the service announcement is transmitted as a portion of one of one or more beacons in a MAC layer superframe of an ultra-wideband (UWB) wireless network.

24. The apparatus of claim 21 wherein the beacon for the service announcement is transmitted as a portion of one of one or more beacon frames in the MAC layer of an 802.11 wireless network.

25. A personal area network (PAN) device comprising:
   an application comprising a local service;
   an application interface to permit a service category corresponding to the application to be selected, and to permit a service announcement corresponding to the application to be advertised;
   a generator logic to generate the service announcement to be advertised;
   a MAC layer processor to insert the service announcement into a beacon in a MAC layer of a PAN and to receive advertisements from other devices on the MAC layer of the PAN;
   a monitor logic coupled with the application interface to monitor the MAC layer of the PAN for advertisements corresponding to the selected service category to be displayed by the application and to select an application matching the service category or to select an inferred application if no application matching the service category is available; and
   a physical layer processor to process the service announcement to be wirelessly transmitted via a radio transmitter as a portion of one of one or more beacon frames in the MAC layer of the PAN.

26. The device of claim 25 wherein the beacon for the service announcement is transmitted as a portion of one of one or more beacon frames in a MAC layer superframe of an ultra-wideband (UWB) wireless network.

27. The device of claim 25 wherein the beacon for the service announcement is transmitted as a portion of one of one or more beacon frames in the MAC layer of an 802.11 wireless network.

28. The device of claim 25 wherein the selected service category corresponds to an electronic game player application.

29. The device of claim 25 wherein the selected service category corresponds to a digital media player application.

30. The device of claim 25 wherein the selected service category corresponds to a shopping application.

31. The device of claim 25 wherein the selected service category corresponds to an instant messaging application.

32. The device of claim 25 wherein the selected service category corresponds to a social networking application.

* * * * *